June 13, 1950   L. A. WERNER   2,511,421
METHOD OF LOW-PRESSURE MOLDING PLASTIC MATERIALS
Filed Feb. 16, 1948
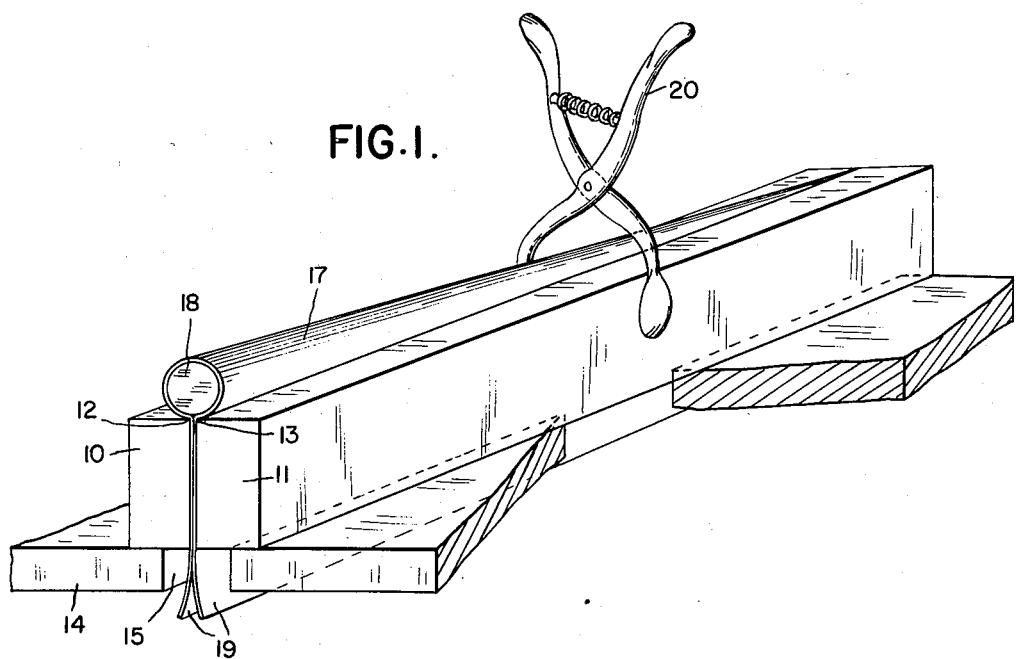
FIG.1.
FIG.2.
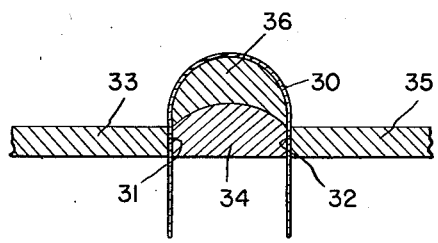
INVENTOR.
LOUIS A. WERNER
BY Whittemore, Hulbert
& Belknap   ATTORNEYS Patented June 13, 1950

2,511,421

UNITED STATES PATENT OFFICE 2,511,421

METHOD OF LOW-PRESSURE MOLDING PLASTIC MATERIALS

Louis A. Werner, Detroit, Mich.

Application February 16, 1948, Serial No. 8,694

6 Claims. (Cl. 18—55)

The present invention relates to a method of low pressure molding plastic material.

It is an object of the present invention to provide a method of molding plastic material in which the plastic material is confined within a flexible envelope which is placed under tension so as to cause the plastic material to assume a shape having a circular cross section.

More specifically, it is an object of the present invention to provide a method of making elongated articles of circular cross section which comprises confining plastic material in a flexible sheet material and thereafter drawing the sheet material around the plastic material and between closely spaced lips so as to apply pressure to the plastic material.

Other objects and features of the invention will become apparent as the description proceeds, especially when taken in conjunction with the accompanying drawing, wherein:

Figure 1 is a diagrammatic perspective view illustrating the manner of carrying out the present method.

Figure 2 is a diagrammatic view illustrating another embodiment of the present invention.

While the present method may be employed to produce a wide variation of articles, it is illustrated as employed to produce an elongated tapered article. In Figure 1 there is shown a pair of blocks 10 and 11 which are spaced apart by a short distance to provide the closely spaced, straight, parallel lips 12 and 13 respectively. Blocks 10 and 11 rest upon a support 14 which may be in a form of a table having an elongated slot 15 therethrough.

A single continuous flexible sheet indicated generally at 17 is provided for confining plastic material 18 therein. This sheet may be formed of a number of different materials but excellent results have been obtained when the flexible sheet material is a poly-vinyl alcohol sheet.

The edges 19 of the sheet 17 are drawn between the lips 12 and 13 and pressure is applied to the plastic material by the act of drawing the edges 19 of the sheet downwardly. Since the plastic material above the lips 12 and 13 is confined solely by the flexible sheet material 17, tension in the sheet material applies pressure uniformly around the plastic material and so causes the plastic material to assume a shape of circular cross section.

The pressure required to form the plastic material to circular cross section need not be large, but if substantial pressure is required, it may be applied simply by increasing the force applied to pull the edges 19 downwardly.

The present invention is not limited to use with any particular plastic material. However, it is particularly useful in the formation of plastic articles reinforced by fibrous material. Thus for example the plastic material 18 may include reinforcing fibers disposed at random therein.

In a preferred practice of the invention the plastic material is composed essentially of plastic treated elongated glass fibers. This material is well adapted to the formation of a fishing rod which of course is shaped to have a slight taper from end to end. In the preliminary assembly of the plastic treated fibers it is preferred to assemble fibers of varying width, some of which extend for the full length of the rod. The shorter fibers, however, extend only from the large end of the rod for different distances therefrom. The variation in thickness of the rod may thus depend upon the number and length of fibers. Moreover, in producing a tapered article having fibers as just described it is preferred to keep the short fibers at the large end of the article toward the center thereof so that the long fibers which extend from end to end of the article form more or less of a covering or envelope around the shorter fibers. This can be arranged by assembling together plastic coated fibers of various lengths with the shorter fibers always located inwardly with respect to the fibers of the next longer length.

In Figure 1 there is illustrated a spring clamp 20 adapted to apply pressure to the portions of the sheet material 17 which projects downwardly between the blocks 10 and 11. This figure is intended to be merely diagrammatic and actually a number of clamps will be provided and they may be of substantial different construction. The essential thing is to provide clamping means which will hold the edges of the flexible sheet material in position after they have been drawn downwardly to apply forming or molding pressure to the plastic material.

After the material has been shaped to its desired circular cross section, the assembly may be removed from the support table 14 and subjected to curing conditions. Normally a thermosetting plastic is preferred and one which is adapted to set or cure under relatively low temperature conditions. Plastics suitable for this purpose are readily available on the open market including plastics which may be completely cured or set at temperatures sufficiently low to prevent injury to the material of the flexible sheet 17.

While the illustrated practice of the invention shows the formation of a uniformly tapered article of circular cross section, it will of course be apparent that the same method is equally useful in the formation of an elongated cylindrical article or one of uniform cross section.

Where the flexible sheet material 17 is a suitably selected poly-vinyl alcohol material, the method may be slightly varied. A sheet of this material may be capable of local stretching so that if desired an elongated article having non-uniform variations in thickness may be produced. Thus, for example, by proper stretching of the sheet material as tension is applied thereto an elongated article of circular cross section may be produced which is provided with relatively abrupt changes in cross section such as more or less conically shaped shoulders.

Referring now to Figure 2 there is illustrated another manner in which the present invention may be carried out. In this case, the same flexible sheet material is employed and is illustrated at 30. Instead of drawing the edges of sheet material through a single slot or between a single pair of lips, the edges are in this case drawn through spaced slots such as indicated at 31 and 32, these slots being provided between support members 33, 34 and 35. In this case, the plastic material 36 is provided with a shape at its underside between the slots 31 and 32 which conforms to the shape of the upper surface of the member 34. The upper surface of the plastic material is shaped into a circular arc of a radius dependent upon the amount of material present within the space defined by the upper surface of the member 34 and that portion of the flexible sheet material 30 which lies above the slots 31 and 32. If sufficient pressure is applied to the plastic material by strong forces applied to the depending edges of the sheet material, the upper surface of the plastic material will assume a cross sectional shape of a circular arc. If less pressure is applied, the upper surface of the plastic material may be somewhat flattened.

As another specific embodiment of the present invention, the plastic material may be drawn between one or more pairs of lips as illustrated at Figures 1 or 2, but the lips may be curved to a desired outline in which case the plastic article may be of circular or partly circular cross section and also curved or bent longitudinally. In like manner, as will be obvious the practice of the invention illustrated in Figure 2 may be modified by providing the slots 31 and 32 in nonparallel relationship which will further modify the shape of the completed article.

While the present invention contemplates a purely manual manipulation of the sheet and while a manual manipulation of the sheet is found to be entirely satisfactory as a commercial method, it is to be understood that the invention may be practiced with automatic means for applying predetermined tension to the sheet. It is further to be understood that the present method is not particularly critical in so far as the pressure employed is concerned. It is important only that sufficient pressure be applied to the plastic material to cause it to assume the desired shape. In some cases, however, and particularly where the plastic material is fiber reinforced, it may be necessary to apply substantially greater pressure than would otherwise be the case. However, flexible sheet material is available by means of which relatively great pressure may be applied.

The present invention contemplates the use of a single continuous sheet of flexible material for shaping or molding the entire article. This permits an article to be produced which is substantially completely smooth on its exterior surface, with the exception of a negligible portion where the edges of the sheet material are drawn between the lips. It is to be contrasted with a previously known method in which plastic material or plastic treated fibrous material was spirally wrapped with a tape-like strip. It will be apparent that even though the ends of the envelope formed by the sheet are open, tensioning of the sheet will cause no substantial extrusion of the plastic material from the open ends of the tube, and this is particularly true where, as in the preferred embodiment, fibers are used to reinforce the plastic material.

The drawing and the foregoing specification constitute a description of the improved method of low pressure laminating and molding plastic material in such full, clear, concise and exact terms as to enable any person skilled in the art to practice the invention, the scope of which is indicated by the appended claims.

What I claim as my invention is:

1. The method of making plastic articles of circular cross-section which comprises doubling a flexible sheet around a mass of plastic material in such a way as to locate the plastic material in the bight of the sheet and to bring side portions of the sheet into contact at one side of the mass of material, drawing the side portions of the sheet through a slot between closely spaced lips to tension the portions of the sheet surrounding the plastic material and to thereby form the plastic material into circular cross-section, and setting the plastic material while retained in circular cross-section.

2. The method of making plastic articles of circular cross-section which comprises doubling a flexible sheet around a mass of plastic material in such a way as to locate the plastic material in the bight of the sheet and to bring the side portions of the sheet into contact at one side of the mass of material, drawing the side portions of the sheet through a slot between closely spaced lips to tension the portions of the sheet surrounding the plastic material and to thereby form the plastic material into circular cross-section, moving the lips together in clamping relation on the portions of the sheet therebetween to retain the plastic material in circular cross-section, and setting the plastic material while retained in circular cross-section.

3. The method of making plastic articles of circular cross-section which comprises doubling a flexible sheet around a mass of plastic material in such a way as to locate the plastic material in the bight of the sheet and to bring side portions of the sheet into contact at one side of the mass of material, drawing the side portions of the sheet through a slot between closely spaced lips to tension the portions of the sheet surrounding the plastic material and to thereby form the plastic material into circular cross-section, drawing portions of the sheet spaced along the lips further therethrough than other portions to vary the diameter of the article, and setting the plastic material while retained in circular cross-section.

4. The method of making an elongated, fiber reinforced body of circular cross-section from plastic material which comprises roughly forming an elongated mass of plastic material having generally parallel fibers disposed along its length, doubling a flexible sheet around the mass of plastic material in such a way as to locate the plastic material in the bight of the sheet and to bring side portions of the sheet into contact at one side of the mass of material, drawing the side portions of the sheet through a slot between closely spaced lips to tension the portions of the sheet surrounding the plastic material and to thereby form the plastic material into circular cross-section, and setting the plastic material while retained in circular cross-section.

5. The method of making an elongated, tapered, fiber reinforced body which comprises assembling a group of plastic-treated fibers of varying length with the shorter fibers disposed inwardly of the longer fibers in a progressive manner, doubling a flexible sheet around the fibers in such a way as to locate the mass of fibers in the bight of the sheet and to bring the side portions of the sheet into contact at one side of the mass of fibers, drawing the side portions of the sheet through a slot between closely spaced lips to tension the portions of the sheet surrounding the fibers and to thereby form the plastic-treated fibers into circular cross-section, and setting the plastic while retaining the sheet under tension.

6. The method of making plastic articles of circular cross-section and of generally cylindrical or conical shape which comprises locating an elongated mass of plastic material in the bight of a doubled sheet of flexible material, bringing side portions of the sheet into contact at one side of said mass, drawing the side portions of the sheet through a slot between closely spaced lips to tension the portions of the sheet surrounding the plastic material and to thereby form the plastic material into circular cross-section, and setting the plastic material while retained in circular cross-section.

LOUIS A. WERNER.

REFERENCES CITED

The following references are of record in the file of this patent:

UNITED STATES PATENTS

| Number | Name | Date |
|---|---|---|
| 1,370,690 | Jacobs | Mar. 8, 1921 |
| 1,481,866 | Heist | Jan. 29, 1924 |
| 1,805,026 | State | May 12, 1931 |
| 2,047,497 | Studt | July 14, 1936 |
| 2,262,861 | Rugeley | Nov. 18, 1941 |
| 2,425,581 | Vincent | Aug. 12, 1947 |